United States Patent
Clavenna, II et al.

(10) Patent No.: US 8,970,704 B2
(45) Date of Patent: Mar. 3, 2015

(54) NETWORK SYNCHRONIZED CAMERA SETTINGS

(75) Inventors: Robert A. Clavenna, II, Lucas, TX (US); Paul V. Hubner, McKinney, TX (US); Kristopher Pate, Flower Mound, TX (US); Steven T. Archer, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 554 days.

(21) Appl. No.: 13/154,505

(22) Filed: Jun. 7, 2011

(65) Prior Publication Data
US 2012/0314077 A1    Dec. 13, 2012

(51) Int. Cl.
*H04N 7/18*     (2006.01)
*H04N 5/272*    (2006.01)
*H04N 21/2187*  (2011.01)
*H04N 21/2665*  (2011.01)

(52) U.S. Cl.
CPC ............ *H04N 5/272* (2013.01); *H04N 21/2187* (2013.01); *H04N 21/2665* (2013.01)
USPC ...................................................... 348/159

(58) Field of Classification Search
USPC ........................................................ 348/159
See application file for complete search history.

(56) References Cited

U.S. PATENT DOCUMENTS

| | | | | |
|---|---|---|---|---|
| 8,289,367 | B2 * | 10/2012 | Graham et al. | 348/14.09 |
| 2006/0078224 | A1 * | 4/2006 | Hirosawa | 382/284 |
| 2009/0096800 | A1 * | 4/2009 | Nakayama et al. | 345/531 |
| 2009/0247173 | A1 * | 10/2009 | Rosmann et al. | 455/450 |
| 2010/0097444 | A1 * | 4/2010 | Lablans | 348/46 |
| 2010/0245585 | A1 * | 9/2010 | Fisher et al. | 348/164 |
| 2011/0115876 | A1 * | 5/2011 | Khot et al. | 348/14.09 |
| 2012/0081503 | A1 * | 4/2012 | Leow et al. | 348/14.07 |

* cited by examiner

*Primary Examiner* — Dave Czekaj
*Assistant Examiner* — Tracy Li

(57) ABSTRACT

A network device receives, from a first video camera system, position information for a first video camera at a first site and sends, to a second video camera system, position instructions for a second video camera at a second site. The position instructions are configured to locate the second video camera within the second site to correspond to a relative position of the first camera in the first site. The network device receives, from the first video camera system, a first video feed including images of the first site and receives, from the second video camera system, a second video feed including images of a subject of the second site. The network device combines the first video feed and the second video feed to generate a synchronized combined video feed that overlays the images of the subject of the second video feed in images of the first site.

17 Claims, 9 Drawing Sheets

NETWORK SYNCHRONIZED CAMERA SETTINGS

BACKGROUND

In live video productions, conducting an interview has been a main feature of content (e.g., late-night talk shows, news/commentary programs, etc.). A host/moderator typically interviews a number of guests. The guest is either local on the same set with the interviewer or at a remote location. The local (same set) interview easily accommodates a "multi-camera shoot" production with, for example, one camera for the host, one camera for the guest(s), and left/right group shot(s) of the host plus guest(s). A director can use any of these shots to put the show together showing the interaction between the host and the answers the guest provides. In a remote location interview, however, the awareness/interaction evident in a local interview tends to be lost. Generally, the production value is deficient and the interaction expectations fail to be met.

DETAILED DESCRIPTION OF PREFERRED EMBODIMENTS

The following detailed description refers to the accompanying drawings. The same reference numbers in different drawings may identify the same or similar elements.

Systems and/or methods described herein may use real-time network communications to synchronize video output for multiple remote sites. In one implementation, the systems and/or methods described herein may enable a single location (e.g., a production studio) to coordinate the synchronized control and movement of cameras at remote locations for live events (e.g., two-dimensional, three-dimensional, and/or holographic events). By allowing control of synchronized movement between locations, the visual appearance of a single location can be presented while multiples locations are physically being used.

In another implementation, the systems and/or methods described herein may enable multiple remote locations to coordinate control and/or movement of cameras at the remote locations for live events (e.g., a video conference). Subjects (e.g., images) at each remote site may be isolated from their respective backgrounds, and camera settings for the remote cameras can be normalized to provide consistent perspectives. The normalized remote images may be combined on a virtual background to provide the visual appearance of a single location including multiple remote subjects.

Figure 1:
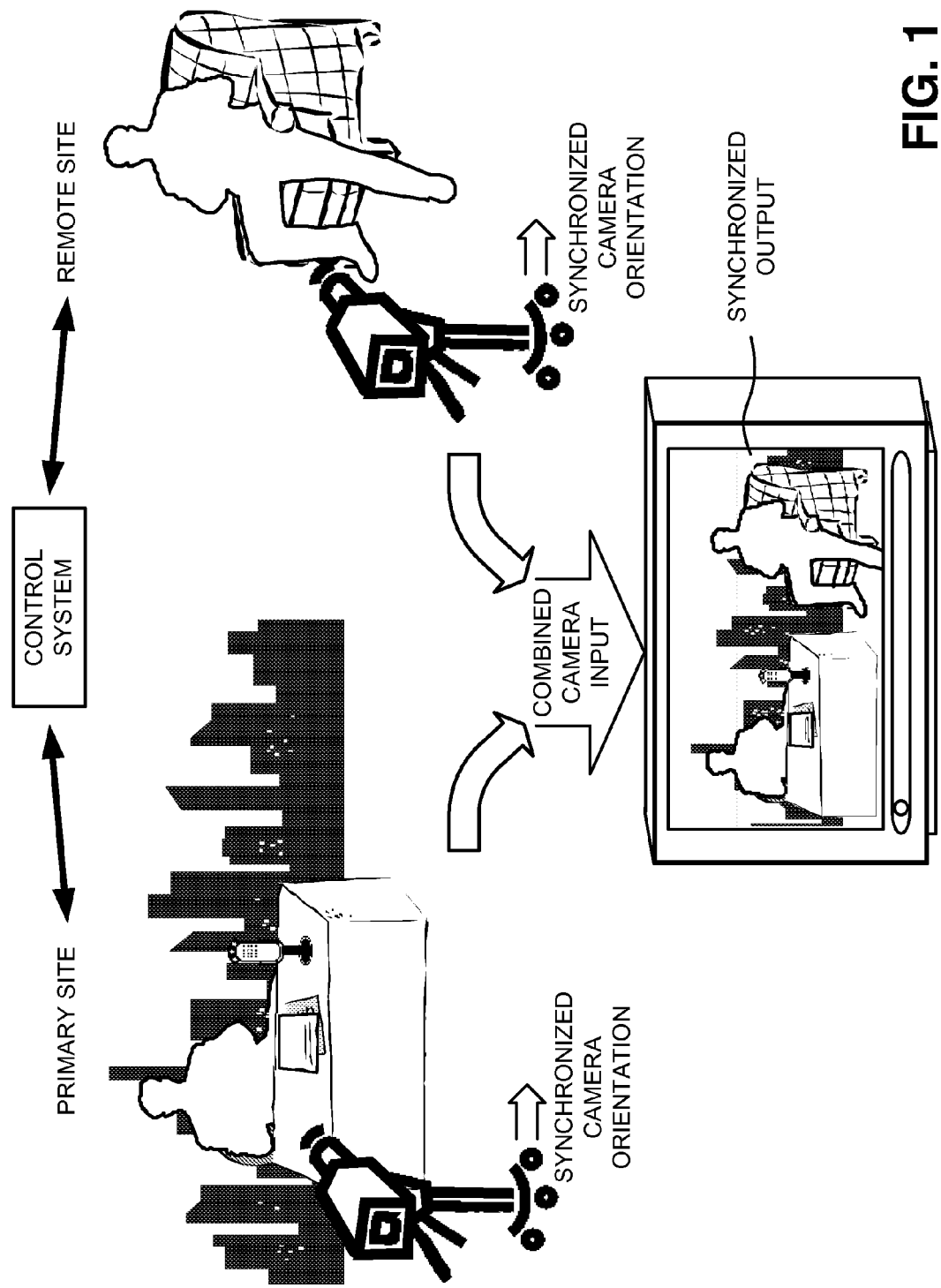
FIG. 1 is an illustration of concepts described herein.

FIG. 1 provides an illustration of concepts described herein. A control system may collect positioning information from a primary site camera rig and may stream this information to one (or more) remote production sites. Positioning information may include, for example, a camera identifier, pan/tilt/pitch, position with relation to the subject(s) (e.g., Cartesian coordinates), zoom and focus length, timing, direction of camera movement, etc. The positioning information may be used to position corresponding cameras at the remote site(s) to match or correspond to the primary site camera position. Processed video from the remote site can be inserted into the video from the primary site to create a single composite scene giving the illusion of two (or more) subjects at the same location.

In one implementation, the remote site may use a blue/green screen to enable chroma key compositing techniques. More particularly, the set design on the remote site could consist of an overlay compositing (aka blue/green screen) surrounding the guest so that 360 degree camera shots can map into the production host set. Visual cue indicators may also be used to help the host and guest conduct virtual eye contact in a more natural sense than just looking into empty space.

In addition to providing an overlay effect, the primary site cameras and the remote site cameras may work in conjunction to replicate movement in single site (e.g., the primary site) with various location subjects. The control system may use live network synchronization between the primary site cameras and the remote site cameras, allowing a production studio to track identical shot positioning. The synchronized camera motions give the feel that both subjects are at the same location.

Figure 2:
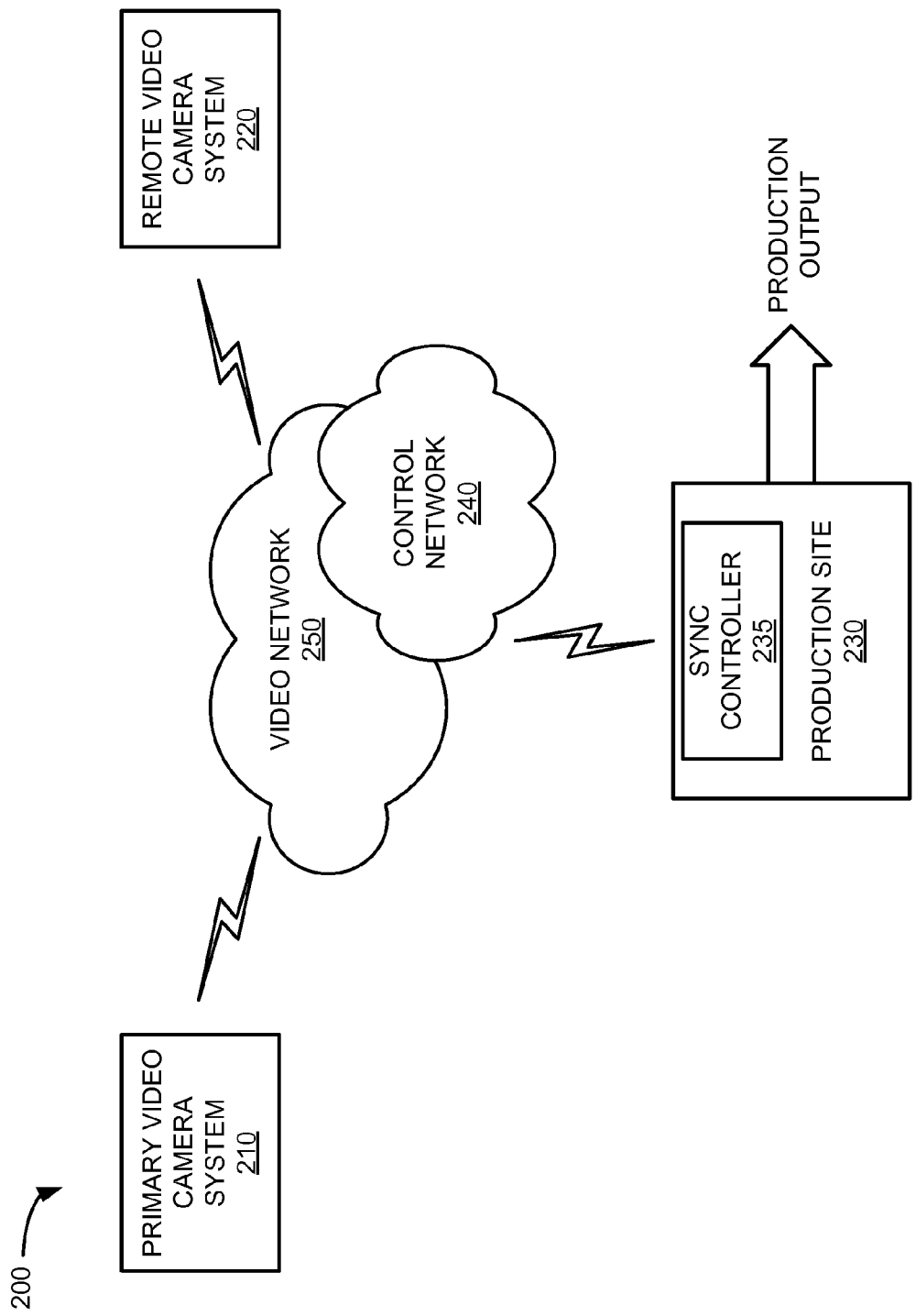
FIG. 2 is a diagram that illustrates an exemplary network in which systems and/or methods, described herein, may be implemented.

FIG. 2 is a diagram that illustrates an exemplary network 200 in which systems and/or methods described herein may be implemented. As shown in FIG. 2, network 200 may include a primary video camera system 210, a remote video camera system 220, a production site 230 with a synchronization controller 235, a control network 240, and a video network 250. Devices and/or networks of FIG. 2 may be connected via wired and/or wireless connections. These components are illustrated in FIG. 1 for simplicity. In practice, there may be more primary video camera systems 210, remote video camera systems 220, production sites 230, synchronization controllers 235, control networks 240, and video networks 250. Also, in some instances, a component of network 200 may perform one or more functions described as being performed by another component or group of components of network 200.

Primary video camera system 210 may capture images from video cameras for a primary recording site (e.g., a studio, a home, etc.) and may track, collect, and/or transmit real-time position information of the cameras. For example, camera rigs at a primary recording site may include optics hardware, sensors, image processing components, control software, and/or mechanical components that generate position information. Position information may include, for example, pan/tilt/pitch, position with relation to the subject(s), zoom and focus length, timing, direction of camera rig movement, etc. Primary video camera system 210 may provide position information for primary site cameras to production site 230 and/or synchronization controller 235 (e.g., via control network 240). Primary video camera system 210 may also provide video content (e.g., captured images) to production site 230 (e.g., via video network 250).

Remote video camera system 220 may include equipment similar to primary video camera system 210 to capture images from video cameras for a remote recording site (e.g., a remote studio, a home, etc.). In one implementation, remote video camera system 220 may include one or more cameras with perspectives corresponding to camera perspectives in primary video camera system 210. Remote video camera system 220 may also include distance sensors to enable isolation of a subject (e.g., in the foreground of a recording site) from a background. Remote video camera system 220 may track, collect, and/or transmit real-time position information of the cameras at the remote recording site. In one implementation, remote video camera system 220 may also receive position information (e.g., of cameras in primary video camera system 210) and/or position instructions (e.g., based on position information from primary video camera system 210) from synchronization controller 235.

Based on the position information and/or position instructions, remote video camera system 220 may alter the settings of one or more camera rigs (e.g., position of camera, focal length, pan/tilt/pitch, zoom, etc.). For example, remote video camera system 220 may receive position instructions from synchronization controller 235 and may automatically alter settings of optics hardware, sensors, image processing components, control software, and/or mechanical components of camera rigs at the remote recording site. Remote video camera system 220 may provide current position information for remote site cameras to production site 230 and/or synchronization controller 235 (e.g., via control network 240). Remote video camera system 220 may also provide video content (e.g., captured images) to production site 230 (e.g., via video network 250).

To facilitate a typical multi-shoot production with a host shot, a guest shot, a left group shot, and a right group shot, network 200 may include pairs of corresponding cameras, such as a host camera pair (e.g., a host camera for primary video camera system 210 and a corresponding host camera for remote video camera system 220), a guest camera pair, a left group camera pair, and a right group camera pair. Other camera combinations may be used. For example, a simplified system may include a left group camera pair and a right group camera pair with an unpaired host camera for primary video camera system 210 and an unpaired guest camera for remote video camera system 220.

Production site 230 may include a television studio or other production facility for live television, recorded live events, acquiring raw footage for post-production, etc. Production site 230 may, for example, provide instructions for use of particular cameras/angles of subjects recorded by primary video camera system 210 or of subjects by remote video camera system 220. In some implementations, production site 230 may be co-located with primary video camera system 210 and/or remote video camera system 220.

Synchronization controller 235 may include one or more server devices, or other types of computation or communication devices to enable live synchronization of cameras in primary video camera system 210 with cameras in remote video camera system 220. For example, synchronization controller 235 may receive position information from primary video camera system 210 and forward the position information to remote video camera system 220. Additionally, or alternatively, synchronization controller 235 may receive position information from remote video camera system 220 and forward the position information to primary video camera system 210. In one implementation, position information provided to synchronization controller 235 may be relative to a subject at a particular location (e.g., a subject at one of the remote site or the primary site) and synchronization controller 235 may transpose the position information relative to a different point of reference on another location (e.g., a subject at one of the primary site or the remote site).

Control network 240 may generally include a local area network (LAN), a wide area network (WAN), a metropolitan area network (MAN), a wireless network, an optical fiber (or fiber optic)-based network, a cable television network, a satellite television network, or a combination of networks. In one implementation, control network 240 may include an IP-based network. In some implementations, control network 240 may be a private network controlled by, for example, a telecommunications company that provides television, telephone, and/or data access to users of primary video camera system 210, remote video camera system 220, and/or production site 230. Control network 240 may provide for data communications between primary video camera system 210 and synchronization controller 235 and between remote video camera system 220 and synchronization controller 235. In another implementation, primary video camera system 210 and remote video camera system 220 may communicate directly (e.g., without using synchronization controller 235). In still another implementation, control network 240 may enable quality of service (QoS) differentiation to prioritize, for example, position information signals between primary video camera system 210, synchronization controller 235 and/or remote video camera system 220.

Video network 250 may generally include a local area network (LAN), a wide area network (WAN), a metropolitan area network (MAN), a wireless network, an optical fiber (or fiber optic)-based network, a cable television network, a satellite television network, or a combination of networks. In one implementation, video network 250 may include all or part of control network 240. Video network 250 may provide for transmission of video signals from primary video camera system 210 and remote video camera system 220 to production site 230 and from production site 230 to primary video camera system 210 and/or remote video camera system 220. Video network 250 may enable high QoS settings and transmit video signals with a low loss rate and low jitter sufficient to enable a videoconference environment (e.g., between the primary site and the remote site).

In systems and/or methods described herein, production site 230 and/or synchronization controller 235 may provide dual control of movement by cameras at primary video camera system 210 and remote video camera system 220. Control network 240 may permit time-sensitive communication of camera position information, while video network 250 may provide concurrent video signals to permit an interactive video experience between subjects of primary video camera system 210 and subjects of remote video camera system 220. Interactions between subjects of primary video camera system 210 and subjects of remote video camera system 220 may, thus, be captured and merged to provide the visual appearance of a single location while two (or more) sites are physically being used. For example, output from corresponding camera pairs may be used by a director to give a true sense of a virtual single location to a viewing audience, such as a pan behind the guest (e.g., a real-time virtual "over the shoulder" shot).

Although FIG. 2 shows exemplary components of network 200, in other implementations, network 200 may include fewer components, different components, differently arranged components, or additional components than depicted in FIG. 2.

Figure 3:
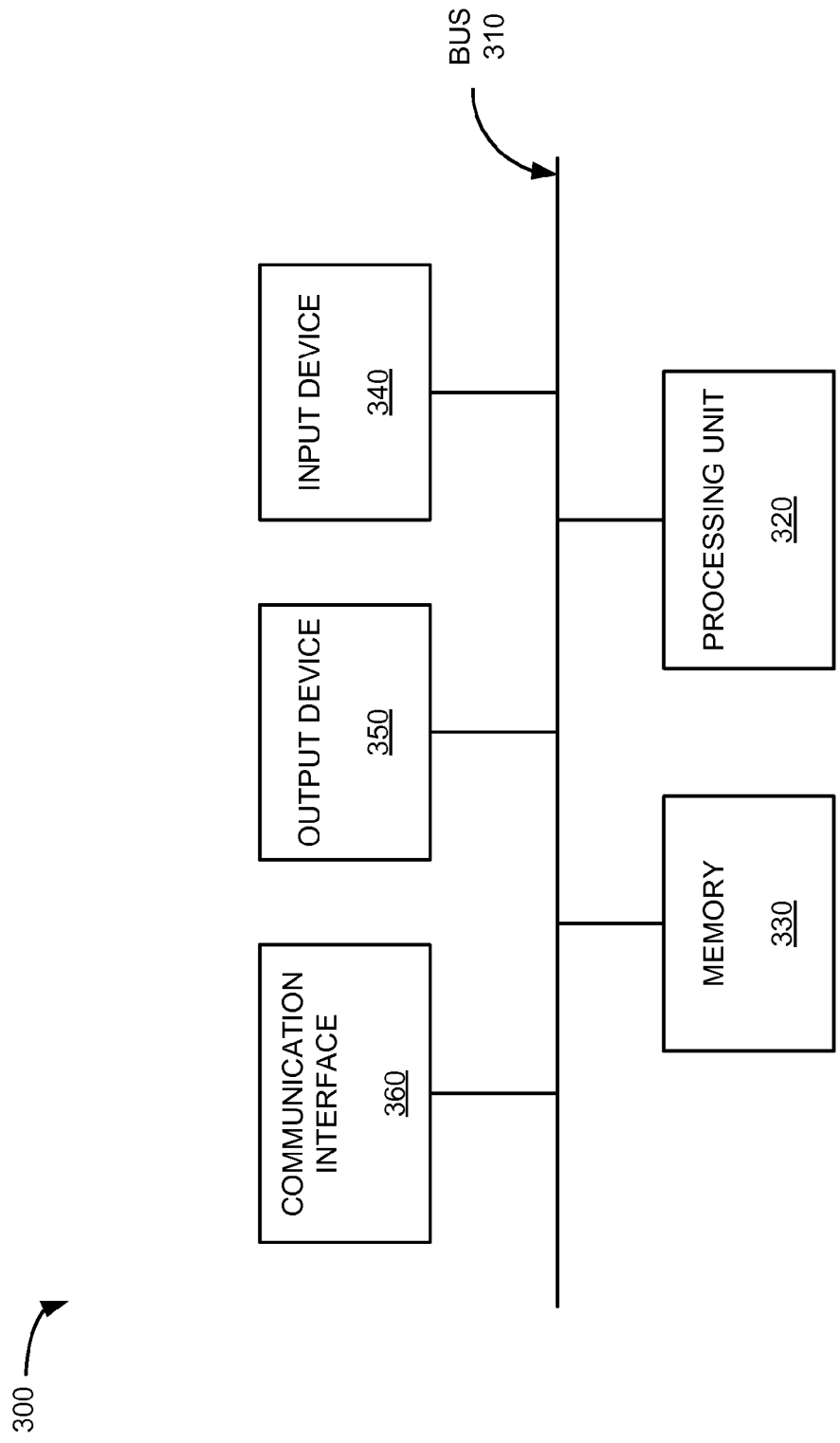
FIG. 3 is a diagram of exemplary components of a device that may be used within the network of FIG. 2.
Figure 8:
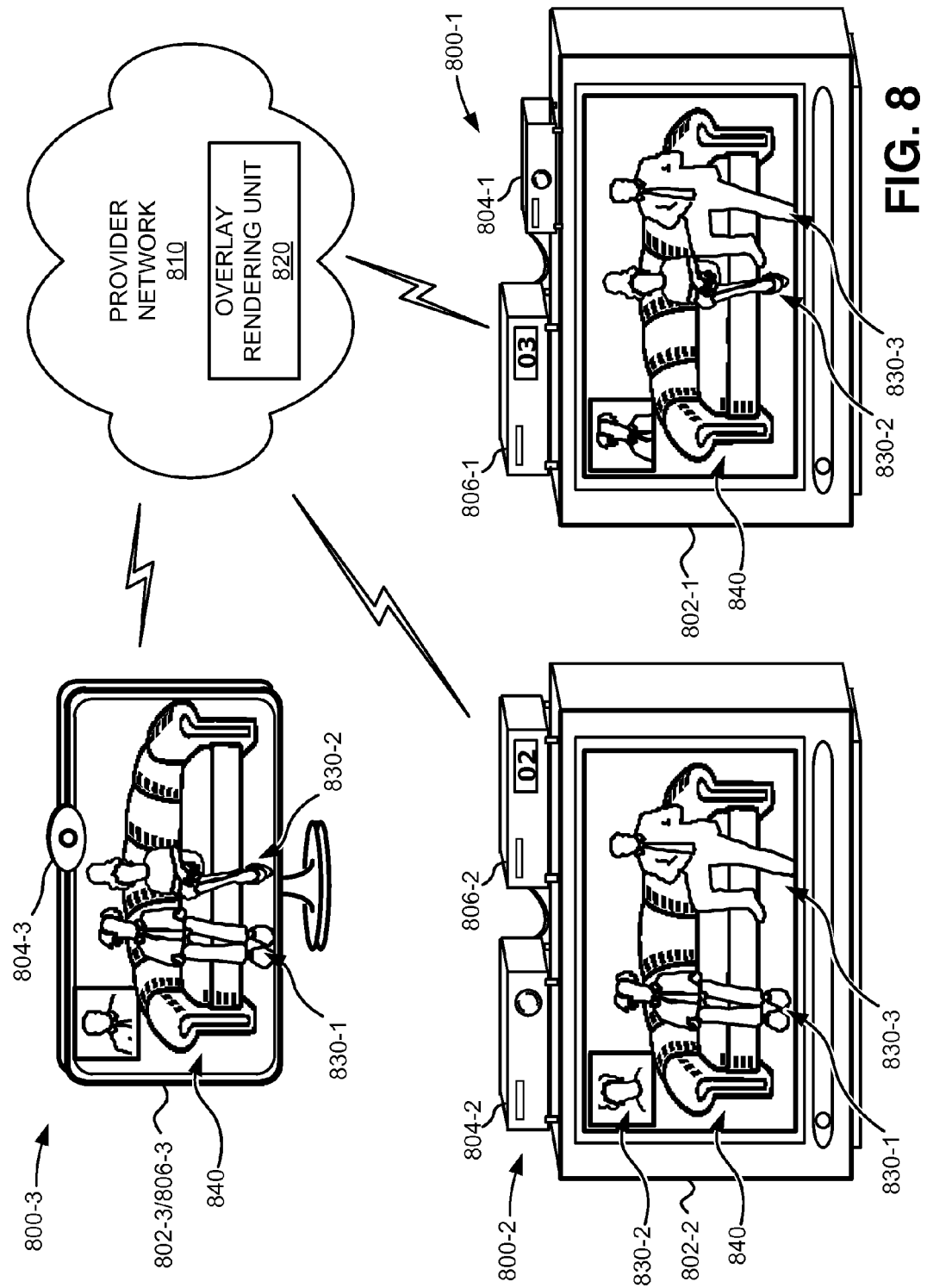
FIG. 8 is a diagram of an exemplary environment for providing synchronized image isolation and a virtual background for video conferencing.

FIG. 3 is a diagram of exemplary components of a device 300 that may correspond to synchronization controller 235, or one or more devices within primary video camera system 210 and remote video camera system 220. Device 300 may also correspond to one or more of video camera 804, network interface device 806, and overlay rendering unit 820 (FIG. 8). As shown in FIG. 3, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include a transceiver (e.g. a transmitter and/or receiver) that enables device 300 to communicate with other devices and/or systems. For example, communication interface 360 may include mechanisms for communicating with other devices, such as other devices of network 200 or another device 300.

As described herein, device 300 may perform certain operations in response to processing unit 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may include fewer components, different components, differently arranged components, or additional components than depicted in FIG. 3. As an example, in some implementations, input device 340 and/or output device 350 may not be implemented by device 300. In these situations, device 300 may be a "headless" device that does not explicitly include an input or an output device. Alternatively, or additionally, one or more components of device 300 may perform one or more other tasks described as being performed by one or more other components of device 300.

Figure 4:
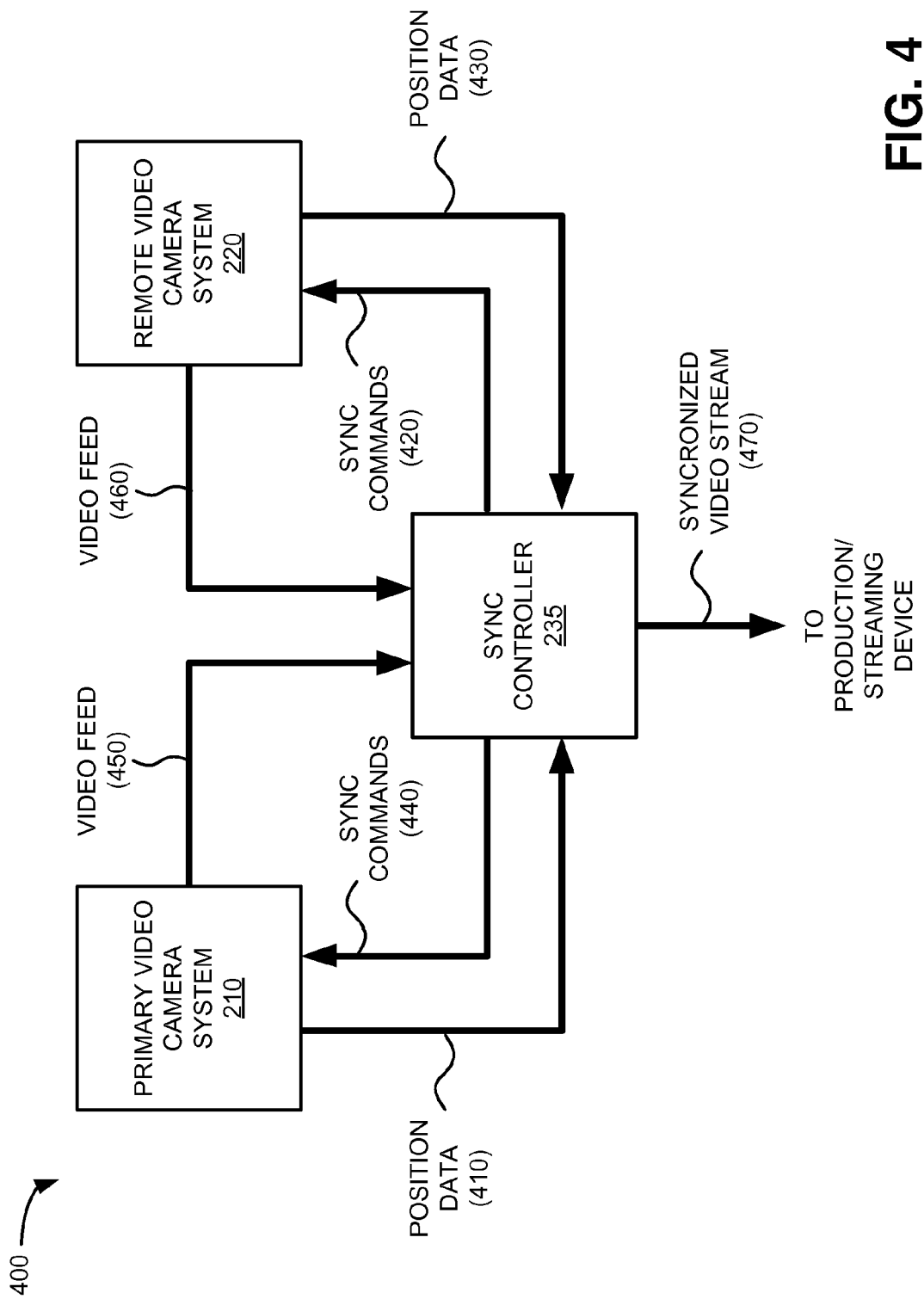
FIG. 4 is a diagram of exemplary interactions between components of an exemplary portion of the network depicted in FIG. 2.

FIG. 4 depicts a diagram of exemplary interactions among components of an exemplary portion 400 of network 200. As illustrated, network portion 400 may include primary video camera system 210, remote video camera system 220, and synchronization controller 235. Primary video camera system 210, remote video camera system 220, and synchronization controller 235 may include the features described above in connection with one or more of FIGS. 2 and 3.

Primary video camera system 210 may collect position data 410 of one or more cameras at a primary site. Position data 410 may include actual position data (e.g., based on recordings of manual adjustments performed by a user of a video camera) and/or position instructions (e.g., command signals provided to perform automated adjustments of a video camera). Primary video camera system 210 may forward position data 410 to synchronization controller 235 (e.g., as a real-time or near-real-time data transmission).

Synchronization controller 235 may receive position data 410 and may generate synchronization commands 420 to position cameras in remote video camera system 220 to match or correspond to that of primary video camera system 210. In one implementation, synchronization controller 235 may calculate a different reference point for remote video camera system 220. For example, synchronization controller 235 may receive position data 410 with measurements relative to a subject of a primary site (e.g., being filmed by primary video camera system 210). Synchronization controller 235 may convert the measurements from position data 410 into measurements relative to a subject of a remote site (e.g., being filmed by remote video camera system 220). Based on position data 410 (and any calculated changes due to a changed reference point), synchronization controller 235 may forward synchronization commands 420 to remote video camera system 220 (e.g., as a real-time or near-real-time data transmission).

Remote video camera system 220 may receive synchronization commands 420 and may automatically position cameras in remote video camera system 220 according to synchronization commands 420. Remote video camera system 220 may collect position data 430 of one or more cameras at a remote site. Position data 430 may include actual position data (e.g., based on recordings and/or sensor readings of automated adjustments performed by a video camera). Remote video camera system 220 may forward position data 430 to synchronization controller 235 (e.g., as a real-time or near-real-time data transmission).

Synchronization controller 235 may receive position data 430 and use position data 430 to verify that cameras in remote video camera system 220 are accurately positioned. Additionally, or alternatively, synchronization controller 235 may use position data 430 to generate synchronization commands 440 to position cameras in primary video camera system 210 to match or correspond to that of remote video camera system 220. For example, if activity being captured by remote video camera system 220 in the remote site is a driving factor in a production, a producer may direct remote controlled (or user controlled) positioning of one or more cameras in remote video camera system 220.

Synchronization controller 235 may receive position data 430 and may generate synchronization commands 440 to position cameras in primary video camera system 210 to match or correspond to that of remote video camera system 220. In one implementation, synchronization controller 235 may generate synchronization commands 440 by calculating a different reference point for primary video camera system 210 than was used by remote video camera system 220.

Cameras in primary video camera system 210 may capture images of a primary site (e.g., a studio or other setting). Images captured by cameras in primary video camera system 210 may be sent to synchronization controller 235 as video feed 450. Similarly, cameras in remote video camera system 220 may capture images of a remote site (e.g., a blue/green screen studio or other setting). Images captured by cameras in remote video camera system 220 may be sent to synchronization controller 235 as video feed 460. In one implantation, remote video camera system 220 may use distance sensor and/or image filters to isolate a subject in the remote site. In this instance, video feed 460 may include, for example, only the subject (e.g., without background) of the remote site. Both video feed 450 and video feed 460 may include timing information, such as a universal time stamp, to enable synchronization of video feed 450 and video feed 460 by, for example, synchronization controller 235.

Synchronization controller 235 may receive video feed 450 and video feed 460. Synchronization control 235 may combine video feed 450 and video feed 460 (e.g., for corresponding cameras at each of primary video camera system 210 and remote video camera system 220) to create a combined synchronized video feed 470. For example, synchronization controller 235 may use timing information from video feed 450 and video feed 460 to synchronize the video feeds and overlay video feed 460 over video feed 450 to create a single synchronized video feed 470. Synchronized video feed 470 may include a single "shot" (or camera view) for a pair of corresponding cameras in primary video camera system 210 and remote video camera system 220, respectively. In one implementation, synchronized video feed 470 may be stored, edited, and/or pieced together with other video feeds to generate a complete program production that alters between multiple different camera shots (e.g., that include other synchronized video feeds).

Although FIG. 4 shows exemplary components of network portion 400, in other implementations, network portion 400 may include fewer components, different components, differently arranged components, and/or additional components than depicted in FIG. 4. Alternatively, or additionally, one or more components of network portion 400 may perform one or more other tasks described as being performed by one or more other components of network portion 400.

Figure 5:
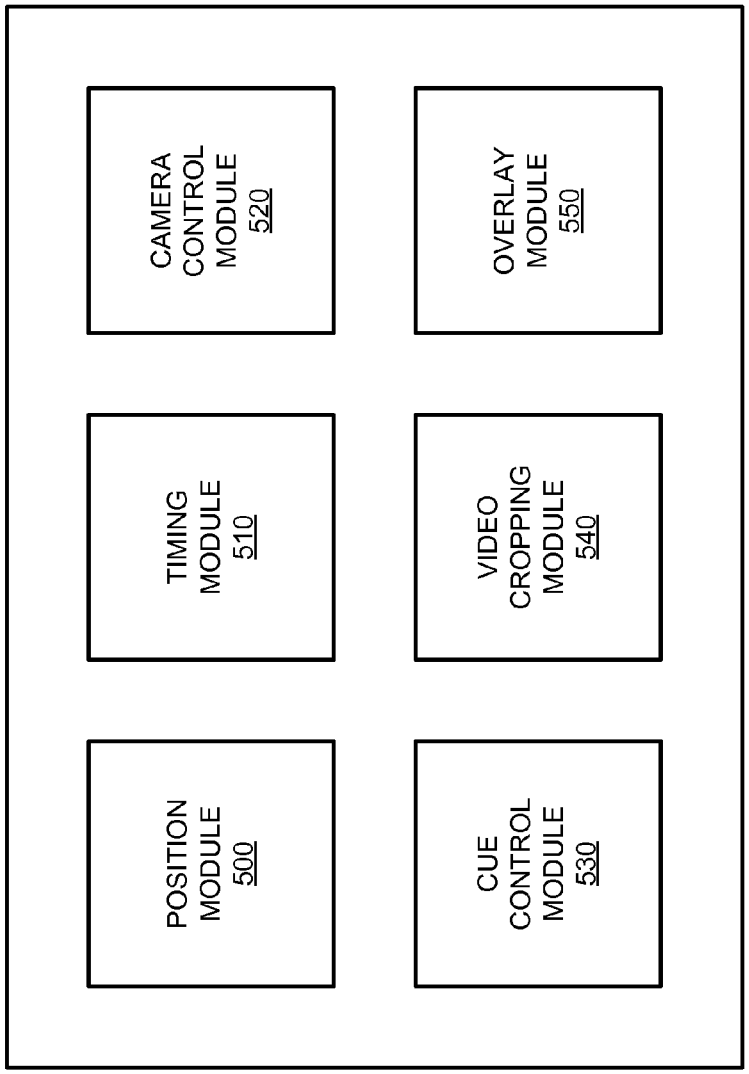
FIG. 5 is a diagram of exemplary functional components of a synchronization controller of FIG. 2.

FIG. 5 is a diagram of exemplary functional components of synchronization controller 235. In one implementation, the functions described in connection with FIG. 5 may be performed by one or more components of device 300 (FIG. 3). As shown in FIG. 5, synchronization controller 235 may include a position module 500, a timing module 510, a camera control module 520, a cue control module 530, a video cropping module 540, and an overlay module 550.

Position module 500 may include hardware or a combination of hardware and software to receive position information from primary video camera system 210 and/or remote video camera system 220. Position module 500 may also calculate a different reference point between a camera in primary video camera system 210 and a corresponding camera in remote video camera system 220. For example, position module may convert position information (e.g., from primary video camera system 210) relative to a subject in a primary site to the same position for a camera in remote video camera system 220 but relative to a subject in the remote site.

Timing module 510 may include hardware or a combination of hardware and software to account for network propagation delays. For example, timing module 510 may receive timing information from primary video camera system 210 and remote video camera system 220. Based on the timing information, timing module 510 may calculate a delay for a first video feed (e.g., video feed 450) and match the timing for a second video feed (e.g., video feed 460) to the network/electronics delays. Thus, timing module 510 may compensate for network (e.g., video network 250) latency to give the output (e.g., synchronized video stream 470) the appearance of reduced delay during interaction between subjects at the primary site and the remote site.

Camera control module 520 may include hardware or a combination of hardware and software to provide position instructions to cameras at primary video camera system 210 and/or remote video camera system 220. For example, based on position information for a camera at primary video camera system 210 received from (or calculated by) position module 500, camera control module 520 may send instructions to remote video camera system 220 to adjust a corresponding camera accordingly.

Cue control module 530 may include hardware or a combination of hardware and software to control visual cue for subjects at the primary site and/or remote site. For example, based on position information for a camera at primary video camera system 210 received from (or calculated by) position module 500, cue control module 530 may calculate a position of a visual cue that corresponds to the virtual position of a subject at the remote site. The visual cue may include, for example, a tennis ball or another object that indicates to a person the location to look to simulate eye contact with the remote subject. In another implementation, the visual cue may include a moveable monitor or another display system that may present a video feed (e.g., video feed 460). The moveable monitor may be adjusted in the line of sight (with respect to the subject at the primary site) of the virtual position of the remote subject. Cue control module 530 send instructions to position the visual cue to primary video camera system 210 and/or remote video camera system 220.

Video cropping module 540 may include hardware or a combination of hardware and software to isolate a subject/image from a remote video feed. For example, in instances where a remote site video feed (e.g., video feed 460) has not already isolated a subject from a background, video cropping module 540 may apply chroma key compositing techniques or other image isolation techniques to crop remote a subject. Video cropping module 540 may provide the cropped video to overlay module 550.

Overlay module 550 may include hardware or a combination of hardware and software to merge a primary video feed with one or more remote video feeds. For example, overlay module 550 may overlay a cropped video feed from remote video camera system 220 with video feed 450 from primary video camera system 210. The combined video feeds may be forwarded (e.g., to production site 230, a primary site, a remote site, a storage facility, etc.) as synchronized video stream 470.

Although FIG. 5 shows exemplary functional components of synchronization controller 235, in other implementations, synchronization controller 235 may include fewer, different, differently-arranged, and/or additional functional components than depicted in FIG. 5. Alternatively, or additionally, one or more components of synchronization controller 235 may perform one or more other tasks described as being performed by one or more other components of synchronization controller 235.

Figure 6:
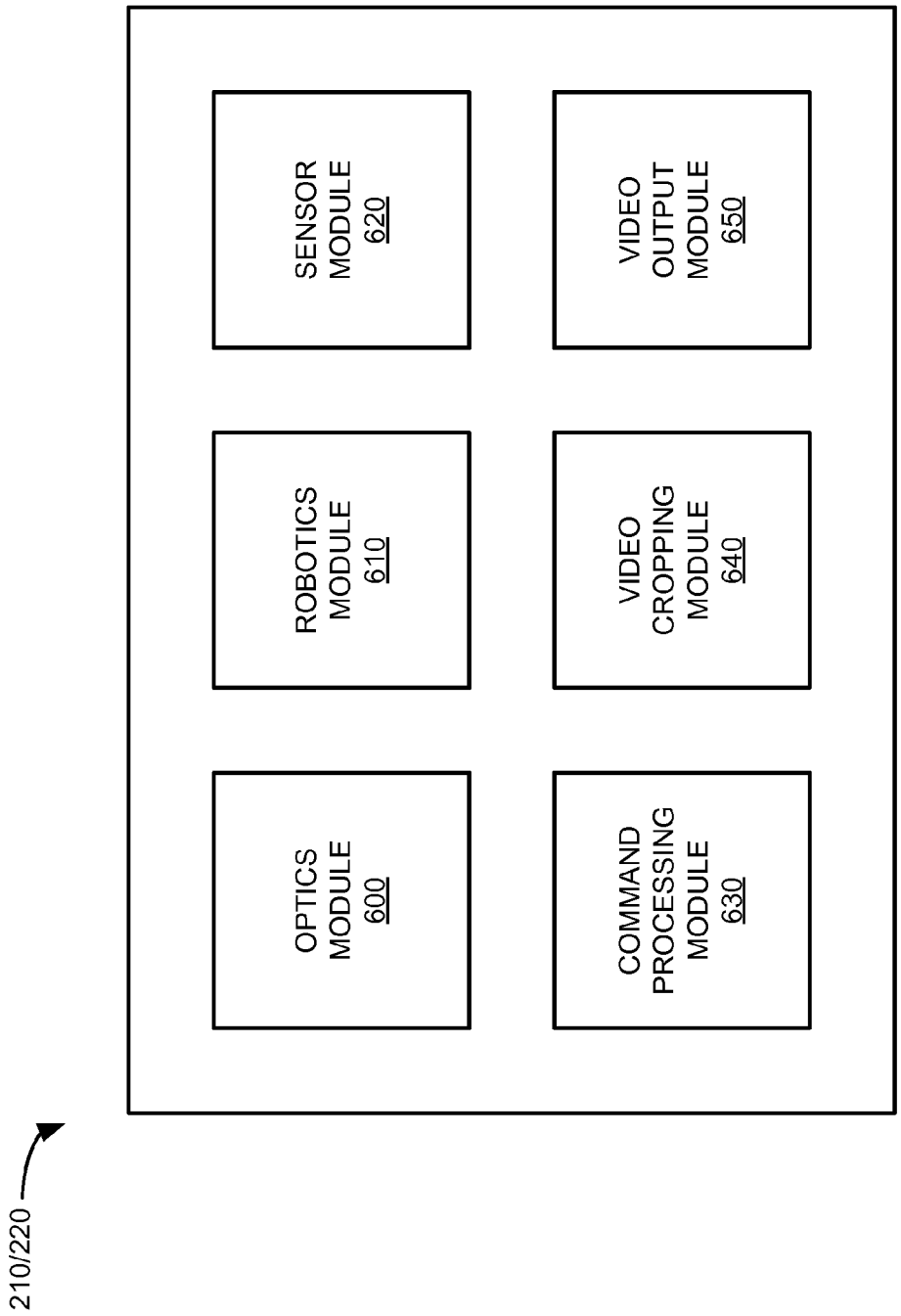
FIG. 6 is a diagram of exemplary functional components of a video camera system of FIG. 1.

FIG. 6 is a diagram of exemplary functional components of primary video camera system 210 or remote video camera system 220. In one implementation, the functions described in connection with FIG. 6 may be performed by one or more components of device 300 (FIG. 3). As shown in FIG. 6, camera system 210/220 may include an optics module 600, a robotics module 610, a sensor module 620, a command processing module 630, a video cropping module 640, and a video output module 650.

Optics module 600 may include optics hardware, such as a lens system configured to focus and capture an incoming image. In one implementation, optics module 600 may include a multi-lens system providing variable zoom, aperture, focus, and/or 3D settings.

Robotics module 610 may include hardware or a combination of hardware and software to receive and implement position commands for camera module 600. For example, a robotics module 610 in remote video camera system 220 may receive a position command from command processing module 630 (e.g., originating from synchronization controller 235) to position an camera module 600 in a synchronized configuration to a corresponding camera module 600 in primary video camera system 210. In one implementation, robotics module 610 may include electro-mechanical components to alter the pan/tilt/pitch of camera module 600; change the position, direction, and/or acceleration of camera module 600 with respect to the subject(s); modify the zoom and/or focus length; etc.

Sensor module 620 may collect and provide, to synchronization controller 235, position information pertaining to a camera within primary video camera system 210/remote video camera system 220 (e.g., movement, orientation, etc.). Position information may also include information that is used to aid in capturing images (e.g., for providing information for auto-focusing to camera module 600) and/or information tracking a subject (e.g., proximity sensor). For example, sensor module 620 may provide acceleration and orientation of a camera to internal processors. In another example, sensor module 620 may provide the distance and the direction of the camera relative to a subject, so that camera module 600 can determine how to adjust focal settings. Examples of sensor in sensor module 620 may include an accelerometer, gyroscope, ultrasound sensor, an infrared sensor, a camera sensor, a distance sensor, a heat sensor/detector, etc. In one implementation, sensor module 620 may provide current position information to synchronization controller 235 on a real-time, or near-real-time, basis. Additionally, sensor module 620 may include a universal clock for use in tracking and/or compensating for network latency.

Command processing module 630 may include hardware or a combination of hardware and software to receive position commands and/or position information from synchronization controller 235 and to convert the position commands and/or position information into instructions that can be implemented by another component of primary video camera system 210 or remote video camera system 220. For example, command processing module 630 may receive a command from synchronization controller 235 to move camera module 600 and generate commands to robotics module 610 to move camera module 600 to a position indicated by synchronization controller 235.

Video processing module 640 may include hardware or a combination of hardware and software to format the image stream from the camera module 600. For example, video processing module 640 may be configured to separate green, red, and/or blue image data into separate data compilations for use in chroma key compositing. That is, video processing module 640 may be configured to separate red data into one data element, blue data into one blue data element, and green data into one green data element. In one implementation, video processing module 640 may be configured to selectively delete blue or green image data. For example, video processing module 640 may perform a deletion analysis to selectively determine which blue/green image data to delete. The deletion analysis may determine if deleting a pattern of rows from the blue/green image data would result in aliasing artifacts, such as Moiré lines, or other visually perceptible artifacts.

Video output module 650 may include hardware or a combination of hardware and software to collect raw video data (e.g., from camera module 600) and/or processed video data (e.g., from video processing module 640) and send the raw and/or processed video to production site 230/synchronization controller 235. In one implementation video output module may convert video to a particular format and or encoding for use by production site 230. For example, video output module 650 may output video in one or more encoded format, such as a TV-compatible video CODEC like Moving Picture Experts Group (MPEG)-2, multiview video coding (MVC), VC-1, MPEG-4 AVC/H.264, etc.

Although FIG. 6 shows exemplary functional components of primary video camera system 210/remote video camera system 220, in other implementations, primary video camera system 210/remote video camera system 220 may include fewer, different, differently-arranged, and/or additional functional components than depicted in FIG. 6. Alternatively, or additionally, one or more components of primary video camera system 210/remote video camera system 220 may perform one or more other tasks described as being performed by one or more other components of primary video camera system 210/remote video camera system 220.

Figure 7:
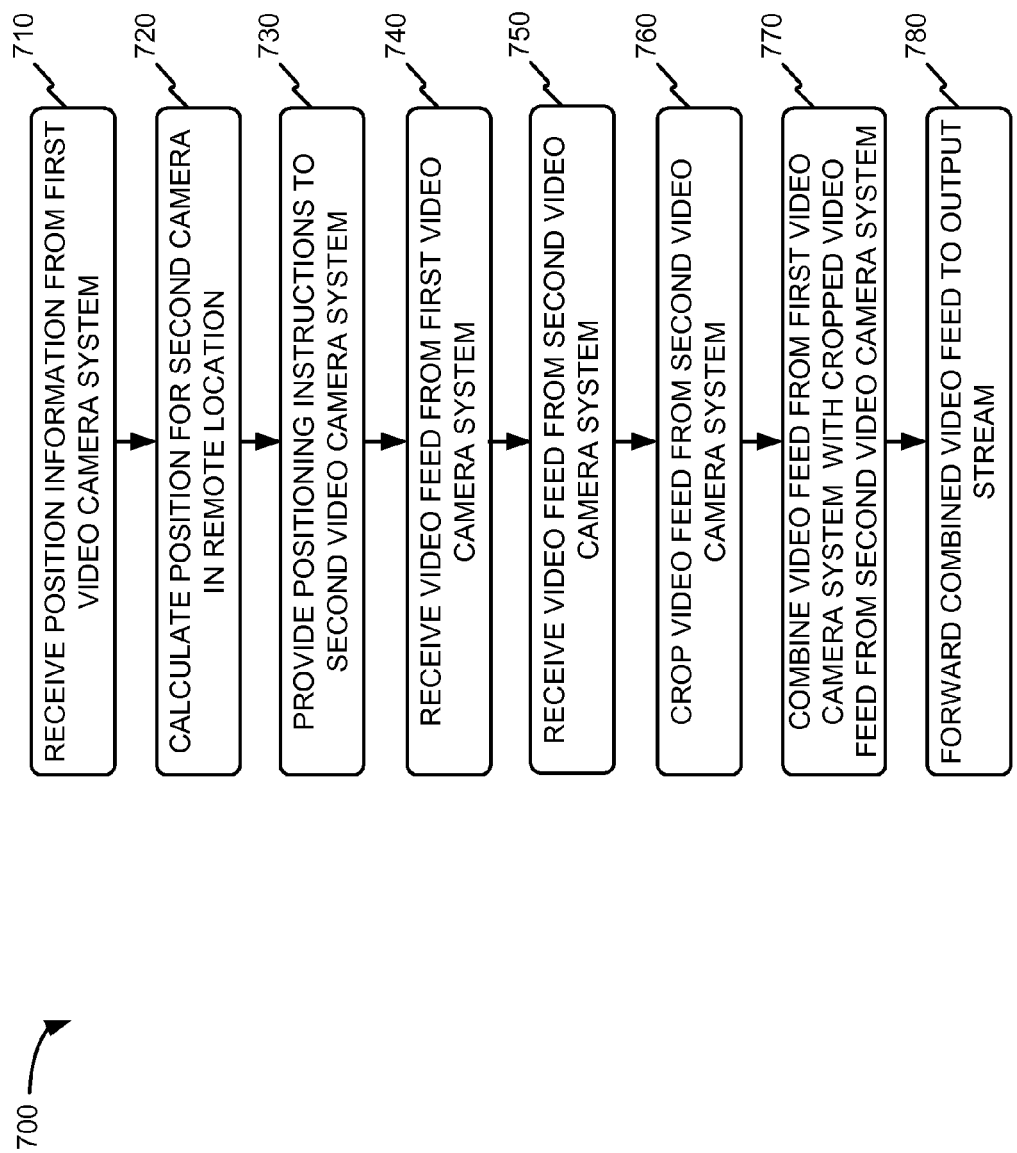
FIG. 7 is a flowchart of an exemplary process for providing synchronized camera movement with image isolation and a virtual background, according to an implementation described herein.

FIG. 7 is a flowchart of an exemplary process 700 for process for providing synchronized camera movement with image isolation and a virtual background, according to an implementation described herein. In one implementation, process 700 may be performed by one or more components of synchronization controller 235, such as one or more processing units 320. In another implementation, one or more blocks of process 700 may be performed by one or more other devices or a group of devices including or excluding synchronization controller 235.

Process 700 may include receiving position information from a first video camera system (block 710), calculating a synchronized position for a second camera in a remote location (block 720), and providing positioning instructions to a video camera system for the second camera (block 730). For example, as described in connection with FIG. 4, primary video camera system 210 may forward position data 410 to synchronization controller 235 (e.g., as a real-time or near-real-time data transmission). Synchronization controller 235 may receive position data 410 and may generate synchronization commands 420 to position cameras in remote video camera system 220 to match that of primary video camera system 210. In one implementation, synchronization controller 235 may calculate a different reference point for remote video camera system 220. For example, synchronization controller 235 may receive position data 410 with measurements relative to a subject of a primary site (e.g., being filmed by primary video camera system 210). Synchronization controller 235 may convert the measurements from position data 410 into measurements relative to a subject of a remote site (e.g., being filmed by remote video camera system 220). Based on position data 410 (and any calculated changes due to a changed reference point), synchronization controller 235 may forward synchronization commands 420 to remote video camera system 220 (e.g., as a real-time or near-real-time data transmission).

Process 700 may also include receiving a video feed from the first video camera system (block 740) and receiving a video feed from the second video camera system (block 750). For example, as described above in connection with FIG. 4, cameras in primary video camera system 210 may capture images of a primary site (e.g., a studio or other setting). Images captured by cameras in primary video camera system 210 may be sent to synchronization controller 235 as video feed 450. Similarly, cameras in remote video camera system 220 may capture images of a remote site (e.g., a remote blue/green screen studio or other setting). Images captured by cameras in remote video camera system 220 may be sent to synchronization controller 235 as video feed 460. In one implementation, remote video camera system 220 may apply image isolation techniques to filter out background from the remote site images.

Referring again to FIG. 7, process 700 may include isolating images received from the second video camera system (block 760). For example, as described above in connection with FIG. 5, in instances where a remote site video feed (e.g., video feed 460) has not already isolated a subject from a background, synchronization controller 235 (e.g., video cropping module 540) may apply chroma key compositing techniques or other image isolation techniques to crop remote a subject.

Process 700 may include combining the video feed from the first video camera system with the video feed from the second video camera system (block 770), and forwarding the combined video feed as a single output stream (block 780). For example, as described above in connection with FIG. 4, synchronization controller 235 may receive video feed 450 and video feed 460. Synchronization control 235 may combine video feed 450 and video feed 460 (e.g., for corresponding cameras at each of primary video camera system 210 and remote video camera system 220) to create a combined synchronized video feed 470. For example, synchronization controller 235 may use timing information from video feed 450 and video feed 460 to synchronize the video feeds and overlay video feed 460 over video feed 450 to create a single synchronized video feed 470 (e.g., with the subject of video feed 460 appearing over the background of the primary site captured by primary video camera system 210.)

FIG. 8 provides an example environment for providing synchronized image isolation and a virtual background for video conferencing, according to another implementation described herein. As shown in FIG. 8, a group of remote sites 800-1, 800-2, and 800-3 (referred to herein collectively as "remote sites 800," and generically as "remote site 800") may be connected via a provider network 810. Provider network 800 may also include an overlay rendering unit 820.

Remote sites 800 may represent different locations of participants in a video conference, such as an extended family. Each remote site 800 may include a display device 802, a video camera 804, and a network interface device 806.

Display device 802 may include a digital or analog display via which a user may view multimedia content (including, for example, conventional programming, interactive displays, and/or video conferencing). Display device 802 may refer to any device that can receive and display multimedia content delivered over provider network 810. Display device 802 may include technologies, such as cathode ray tube (CRT) displays, liquid crystal displays (LCDs), light-emitting diode (LED) displays, plasma displays, etc.

Video camera 804 may include a camera to collect video images of a user (or, generally, an area in front of video camera 804). Video camera 804 may include some or all of the features described above with respect to remote video camera system 210. For example, video camera 804 may include optics hardware, sensors, image processing components, control software, and/or mechanical components that generate position information of a subject. In one implementation, video camera 804 may include distance and/or motion identifiers to isolate a subject (e.g., a person) from a background of remote site 800.

Network interface device 806 may include any device capable of receiving, transmitting, and/or processing information to and/or from provider network 810. In one implementation, network interface device 806 may be a closed device (e.g., including a hardware/software configuration that is not accessible to the general public). In another implementation, network interface device 806 may be a general purpose computing device using, for example, particular software such as a videoconferencing or video chat software application. Examples of network interface device 806 may include a set-top box, a computer, a cable card, and a portable electronic device (e.g., a cell phone, a personal digital assistant (PDA), etc.). Network interface device 806 may receive a video signal and/or position information (e.g., from video camera 804) and may transmit the signal to overlay rendering unit 820. Network interface device 806 may also receive, from overlay rendering unit 820, video conference signals and may convert the signals to a form usable by display device 804. In one implementation, video camera 804 and network interface device 806 may be combined in a single device.

Provider network 810 may include a local area network (LAN), a wide area network (WAN), a metropolitan area network (MAN), a wireless network, an optical fiber (or fiber optic)-based network, a cable television network, a satellite television network, or a combination of networks. In one implementation, provider network 810 may include an IP-based network. In some implementations, provider network 810 may be a private network controlled by, for example, a telecommunications company that provides video conferencing services to consumers. Provider network 810 may provide for communications between network interface devices 806 and overlay rendering unit 820.

Overlay rendering unit 820 may include one or more network devices, or other types of computation or communication devices to enable live synchronization of video feeds from cameras 804. For example, overlay rendering unit 820 may receive isolated images (e.g., isolated images 830-1, 830-2, and 830-3) from different network interface devices 806, overlay the images into combined video feeds, and forward the combined video feeds (e.g., with different combinations of the overlaid images) to different network interface devices 806. Additionally, or alternatively, overlay rendering unit 820 may apply a separate virtual background 840 (e.g., a virtual couch, conference table, etc.) in which to place the images from different network interface devices 806.

Still referring to FIG. 8, assume multiple family members log into a video conference bridge facilitated by provider network 810 and overlay rendering unit 820. Each network interface device 806 may provide a video feed (generated by video camera 804) to overlay rendering unit 820. Each person (or group) may be rendered and isolated via three-dimensional input from the image isolation of respective video camera 804 to generate a personal image (e.g., isolated images 830-1, 830-2, and 830-3). Since distance and motion identification is recognizable from video camera 804, each person can be isolated out of the original image and only the personal image (e.g., without background images) can be sent to overlay rendering unit 820. Virtual background 840 can be used to display the image 830 of each user in place. Distance information from each video camera 804 may allow for overlays to occur between remote sites 800, so it can look as though one person is sitting in front of or next to another.

In one implementation, overlay rendering unit 820 may use distance information from each camera 804 to normalize a size of isolated images 830-1, 830-2, and/or 830-3. For example, overlay rendering unit 820 may receive distance information from each of network interface devices 806 and determine a focal distance or magnification (zoom) value to be used by each of video cameras 804 to normalize isolated images received from network interface devices 806. Overlay rendering unit 820 may provide position/focal information to each video camera 804 (via network interface device 806) to have normalized image sizes sent from each remote site 800. With this process data sent from network interface devices 806 over provider network 810 is limited to audio and isolated images (e.g., of each person). Background images from each remote site 800 may not be transmitted, since it will not be required for image processing by overlay rendering unit 820. In another implementation, overlay rendering unit 820 may calculate a normalized size vector to apply to images received from network interface devices 806 to achieve size similarity.

Overlay rendering unit 820 may insert, onto virtual background 840, a customized combination of images (or normalized images) for each remote site 800. For example, a composite video feed for a user at remote site 800-1 may include isolated images 830-2 and 830-3 from users of users at remote sites 800-2 and 800-3, while a composite video feed for a user at remote site 800-2 may include isolated images 830-1 and 830-3 from users of users at remote sites 800-1 and 800-3. Each display device 802 may present the composite video feed with virtual background 840 and isolated images 830-1, 830-2, and/or 830-3. When a person at one of remote sites 800 moves, the corresponding camera 804 may be configured to follow the person (and continue to isolate the image) until the person moves "off camera."

Figure 9:
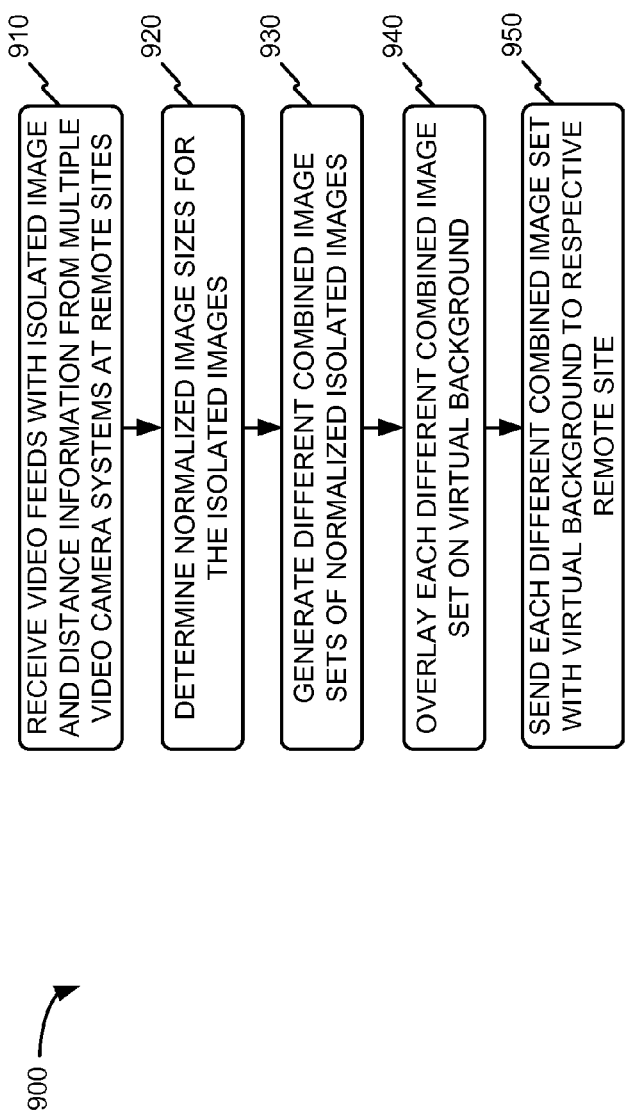
FIG. 9 is a flowchart of an exemplary process for providing synchronized image isolation and a virtual background for video conferencing, according to an implementation described herein.

FIG. 9 is a flowchart of an exemplary process 900 for process for providing synchronized image isolation and a virtual background for video conferencing, according to an implementation described herein. In one implementation, process 900 may be performed by one or more components of overlay rendering unit 820, such as one or more processing units 320. In another implementation, one or more blocks of process 900 may be performed by one or more other devices or a group of devices including or excluding overlay rendering unit 820.

Process 900 may include receiving video feeds with isolated image and distance information from multiple video camera systems at remote sites (block 910). For example, as described in connection with FIG. 8, each network interface device 806 may provide video feeds (generated by video camera 804) to overlay rendering unit 820. Each person (or group) in each remote site 800 may be rendered and isolated via three-dimensional input from the image isolation of respective video camera 804 to generate a personal image (e.g., isolated images 830-1, 830-2, and 830-3).

Process 900 may further include determining normalized images sizes for the isolated images (block 920). For example, as described in connection with FIG. 8, overlay rendering unit 820 may use distance information from each camera 804 to normalize a size of isolated images 830-1, 830-2, and/or 830-3. For example, overlay rendering unit 820 may receive distance information from each of network interface devices 806 and determine a focal distance or magnification (zoom) value to be used by each of video cameras 804 to normalize isolated images received from network interface devices 806. Overlay rendering unit 820 may provide position/focal information to each video camera 804 (via network interface device 806) to have normalized image sizes sent from each remote site 800. With this process, data sent from network interface devices 806 over provider network 810 is limited to audio and isolated images (e.g., of each person). Background images from each remote site 800 may not be transmitted, since it will not be required for image processing by overlay rendering unit 820. In another implementation, overlay rendering unit 820 may calculate a normalized size vector to apply to images received from network interface devices 806 to achieve size similarity.

Process 900 may also include generating different combined image sets of normalized isolated images (block 930) and overlaying each of the different combined image sets on virtual background (block 940), and sending each of the different combined image sets with the virtual background to a respective remote site (block 950). For example, as described in connection with FIG. 8, overlay rendering unit 820 may insert, onto virtual background 840, a customized combination of images (or normalized images) for each remote site 800. For example, a composite video feed for a user at remote site 800-1 may include isolated images 830-2 and 830-3 from users of users at remote sites 800-2 and 800-3, while a composite video feed for a user at remote site 800-2 may include isolated images 830-1 and 830-3 from users of users at remote sites 800-1 and 800-3.

Systems and/or methods described herein may use real-time network communications to synchronize video output for multiple remote sites. In one implementation, the systems and/or methods may enable a single location (e.g., a production studio) to coordinate the synchronized control and movement of cameras at remote locations for live events (e.g., two-dimensional, three-dimensional, and/or holographic events) to provide a visual appearance of a single location while two locations are physically being used.

In another implementation, the systems and/or methods may enable multiple remote locations to coordinate control and/or movement of cameras at the remote locations. Subjects (e.g., images) at each remote site may be isolated from their respective backgrounds, and camera settings for the remote cameras can be normalized to provide consistent perspectives. The normalized remote images may be combined on a virtual background to provide the visual appearance of a single location including multiple remote subjects.

The foregoing description provides illustration and description, but is not intended to be exhaustive or to limit the invention to the precise form disclosed. Modifications and variations are possible in light of the above teachings or may be acquired from practice of the invention. For example, additional sensors and/or equipment may be included in a primary site and/or remote site(s) to ensure consistent lighting between the primary site and the remote site(s).

Additionally, while series of blocks have been described with respect to FIGS. 7 and 9, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" that performs one or more functions. These components may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
    receiving, by a computing device and from a first video camera system, position information for a position of a first video camera relative to a first subject at a first site;
    determining, by the computing device, position instructions for a second video camera at a second site that is remote from the first site, wherein the position instructions are configured to locate the second video camera within the second site to correspond to the position of the first camera relative to the first subject in the first site, and wherein the position instructions include one of:
        position information with respect to a corresponding virtual location of the first subject in the second site, or
        position information with respect to a corresponding virtual location of the second subject in the first site;
    sending, by the computing device and to a second video camera system at the second site, the position instructions;
    receiving, by the computing device and from the first video camera system, a first video feed including images of the first site;
    receiving, by the computing device and from the second video camera system, a second video feed including images of a second subject of the second site; and
    combining, by the computing device, the first video feed and the second video feed to generate a synchronized combined video feed that overlays the images of the second subject of the second video feed in images of the first site so as to provide a visual appearance of the images of the first site and the second subject of the second site in a single location.

2. The method of claim 1, wherein the images of the first site include the first subject and a background, and wherein the second subject of the second site is overlaid on a different portion of the background than is occupied by the first subject of the first site.

3. The method of claim 1, further comprising:
    isolating, by the computing device, the second subject of the second video feed.

4. The method of claim 1, further comprising:
    isolating, by the second camera system, the second subject of the second video feed.

5. The method of claim 1, further comprising:
    receiving position information for the second video camera at the second site; and
    sending other position instructions to the first site based on the position information for the second video camera at the second site.

6. The method of claim 1, further comprising:
    storing, by the computing device, the synchronized combined video feed.

7. The method of claim 1, wherein the first video feed and the second video feed include timing information to synchronize the first video feed and the second video feed.

8. The method of claim 1, wherein the first video feed and the second video feed are received via a video network, and wherein the position information for the first video camera is received via a data network that is different than the video network.

9. The method of claim 1, wherein the first video camera system and the second video camera system include multiple camera pairs.

10. A network device, comprising:
    a memory to store a plurality of instructions; and
    a processor configured to execute instructions in the memory to:
        receive, from a first video camera system, position information for a position of a first video camera relative to a first subject at a first site;
        send, to a second video camera system at a second site that is remote from the first site, position instructions for a second video camera at the second site, wherein the position instructions are configured to locate the second video camera within the second site to correspond to the position of the first camera relative to the first subject in the first site, and wherein the position instructions include position information with respect to a corresponding virtual location of the second subject of the second site or position information with respect to a corresponding virtual location of the second subject in the first site;
        receive, from the first video camera system, a first video feed including images of the first site;
        receive, from the second video camera system, a second video feed including images of a second subject of the second site; and
        combine the first video feed and the second video feed to generate a synchronized combined video feed that overlays the images of the second subject of the second video feed in images of the first site so as to provide a visual appearance of the images of the first site and the second subject of the second site in a single location.

11. The network device of claim 10, wherein the processor is further configured to:
    receive position information for a second video camera at the second site; and
    send other position instructions to the first site based on the position information for the second video camera at the second site.

12. The network device of claim 10, wherein the second video feed including images of the second subject of the second site includes background images, and wherein the processor is further configured to:
    isolate the images of the second subject from the background images.

13. The network device of claim 10, wherein the first video feed and the second video feed include timing information, and wherein the processor is further configured to synchronize the first video feed and the second video feed based on the timing information.

14. The network device of claim 10, wherein, when sending the position instructions for the second video camera at the second site, the processor is further configured to send the position instructions via a data network, and wherein, when receiving the first video feed, the processor is further configured to receive the first video feed via a video network that is different than the data network.

15. A non-transitory computer-readable medium, storing instructions executable by one or more processors, the non-transitory computer-readable medium comprising one or more instructions to:

receive, from a first video camera system, position information for a position of a first video camera at a first site;

send, to a second video camera system at a second site that is remote from the first site, position instructions for a second video camera at the second site, wherein the position instructions are configured to locate the second video camera within the second site to correspond to the position of the first camera in the first site, and wherein the position instructions include position information with respect to a corresponding virtual location of the second subject of the second site or position information with respect to a corresponding virtual location of the second subject in the first site;

receive, from the first video camera system, a first video feed including images of the first site;

receive, from the second video camera system, a second video feed including images of a remote subject of the second site; and combine the first video feed and the second video feed to generate a synchronized combined video feed that overlays the images of the remote subject of the second video feed in images of the first site so as to provide a visual appearance of the images of the first site and the remote subject of the second site in a single location, wherein the first video feed and the second video feed include timing information to synchronize the first video feed and the second video feed.

16. The non-transitory computer-readable medium of claim 15, wherein the images of the first site include a first subject and a background, and wherein the non-transitory computer-readable medium further comprises one or more instructions to:

overlay the remote subject of the second site on a different portion of the background than is occupied by the first subject of the first site.

17. The non-transitory computer-readable medium of claim 15, wherein the first video camera system and the second video camera system include multiple camera pairs.

\* \* \* \* \*